United States Patent [19]

Oudem

[11] 4,176,117

[45] Nov. 27, 1979

[54] PROCESS FOR OBTAINING GELATIN

[76] Inventor: Leon Oudem, Av. Casper Libero, 573-10 And. Conj. 3, São Paulo, Brazil

[21] Appl. No.: 828,991

[22] Filed: Aug. 30, 1977

[30] Foreign Application Priority Data

Mar. 11, 1977 [FR] France ................................. 77 07254

[51] Int. Cl.² .......................... C09H 7/00; A23J 1/10; C09H 3/00
[52] U.S. Cl. .................................... 260/118; 260/123.7
[58] Field of Search ...................... 260/117, 118, 123.7

[56] References Cited

U.S. PATENT DOCUMENTS

| | | | |
|---|---|---|---|
| 2,398,004 | 4/1946 | Houck et al. | 260/118 |
| 2,992,213 | 7/1961 | Gates et al. | 260/118 X |
| 4,021,522 | 5/1977 | Daniel | 260/123.7 X |

*Primary Examiner*—Walter C. Danison
*Attorney, Agent, or Firm*—Fisher, Christen & Sabol

[57] ABSTRACT

The invention relates to the manufacture of gelatin, whereby the gelatin is obtained from fresh derms removed from scraps of hides, sinews and tendons within the three hours following the slaughter of the animal; these materials are collected together and washed in cold water then in a solution of dilute sodium hydroxide, subjected to a mechanical separation of fibres until they are reduced to paste, they are then washed several times in cold water in order to eliminate the albumin of the blood, the paste thus washed and rinsed is filtered by pressing until a cake is obtained which is formed of pure collagen; said latter may be stored after dehydration for an indefinite length of time; it may then be subjected to the final cooking, producing a gelatin broth subjected to gelling on a conveyor belt circulating in a chamber maintained at 5° C. and associated with a drying chamber provided with a blower and in which the film of gelatin is conveyed on conveyor belts, the film being wound on a reel on leaving the drying chamber.

11 Claims, 2 Drawing Figures fig:1

PROCESS FOR OBTAINING GELATIN

BACKGROUND OF THE INVENTION

The present invention relates to a process for obtaining gelatin from organic waste of animal origin.

SUMMARY OF THE PRIOR ART

Gelatin is presently manufactured from organic matter of animal origin, such as hide waste from tanneries, bones, cartilages, sinews from abattoirs; the known processes of treating this raw material enable gelatin to be obtained by hydrolysis of the collagen which the raw material contains, after elimination of the foreign matter.

In the case of bones, the calcium is removed by prolonged maceration in an acid solution; in the case of derms of hides, sinews etc. . . . , the foreign matter such as albumin, condrin, mucin, keratin, are eliminated by a prolonged maceration in milk of lime; these phases of the process are in all cases preceded or followed by de-greasing phases.

The presently known processes are therefore slow to carry out and require expensive installations; the raw material is collected together at the site of treatment after having travelled in bulk under conditions which do not guarantee their preservation; the raw materials sometimes arrive in a virtually rotting state and their handling and sorting are particularly unpleasant for the personnel; in addition, the state of the raw materials consequently requires several washings thereof.

Subsequently, the treatment includes successive cookings of the products in water, each cooking lasting 6 to 8 hours, until gelatin is obtained in the state of broth; this latter must then be concentrated, after which the broth is placed in a cold chamber to provoke gelling of the product; the gelled block is then cut into slices and possibly further reduced to granules or platelets, which are conveyed to a drier with a view of obtaining a product with low water content.

Apart from the considerable time required for carrying out the presently known processes, said latter also imply a certain number of handlings of the product before gelling and on the other hand after, i.e. at the stage of obtaining the final product; in fact, the gelatin block is cut into slices and possibly reduced to finer particles before passing to the drying phase, and these various operations are carried out manually by the personnel.

The present invention remedies these drawbacks and enables a finished product in the form of substantially dehydrated gelatin to be continuously produced in a considerably shorter period of time than that required for carrying out prior known processes.

The process according to the invention also eliminates a major part of the manual handling necessary in the prior known processes and enables a largely mechanised process to be carried out.

SUMMARY OF THE INVENTION

The invention relates not only to a novel process but also to a machine and equipment for carrying out this process.

To this end, the invention relates to a process for manufacturing gelatin from animal waste, wherein the raw materials (constituted by hide wastes, sinews or tendons) are treated, straight after slaughter, and are subjected to the following successive operations:

(a) the raw materials (derms of hides, sinews or tendons) are washed and de-greased in a solution of sodium hydroxide enabling the pores to dilate and facilitating elimination of the blood and fatty matter.

(b) the material is subjected to a chopping operation reducing it to the state of paste.

(c) the pH of the paste is adjusted in order to neutralise the sodium hydroxide resulting from initial washing phase (a) and the paste thus brought to a neutral pH is washed several times in cold water and rinsed.

(d) the paste is then subjected to filtration by pressing to express the water therefrom and conserve only the solid matter forming the cake.

(e) the cake resulting from the preceding filtration and constituted by virtually pure collagen, is subjected to cooking, yielding a broth of gelatin of high density, which is subsequently subjected to gelling at low temperature and to drying.

The reduction of the raw materials into paste is preferably effected in a so-called cutter, of the type used for chopping meat.

The high density broth is preferably poured onto a conveyor belt circulating in a low-temperature chamber, at about 5° C., to obtain gelling.

The belt is preferably made of stainless steel.

According to another feature, the film of gelled gelatin, on leaving the gelling belt, is deposited on a succession of conveyor belts circulating in a drying chamber supplied with fresh air by a blower member, and the film on leaving the drying chamber is wound into rolls.

According to yet another feature, the raw materials, before the phase of reduction into paste, are subjected by washing by immersion in a sodium hydroxide solution of normality close to 0.25 N, at a temperature of the order of 10° C. for a period of time of 2 to 6 hours, the whole being subjected to stirring.

The paste, before the phase of filtration by pressing, is preferably subjected to several washings in cold water, at a temperature lower than 30° C. with stirring and rinsing.

According to an embodiment of the invention, the cake obtained after pressing and constituted by the dry extract of the washed paste, constituted by substantially pure collagen, is dried and stored for an indefinite period of time, this intermediate product, constituted by a collagen cake, being subsequently taken out of storage and subjected to the subsequent phase of cooking to obtain gelatin.

According to another feature, the collagen cake is cooked at a temperature of 50° to 60° C. by immersion in a quantity of water corresponding to twice to six times the weight of collagen treated, this cooking being continued for a period of 3 to 5 hours, the broth obtained, cooled to 40° C., then being subjected to gelling and being poured to this end on a steel conveyor belt circulating in a chamber. cooled to a temperature of the order of 5° C.

The invention also relates to an apparatus for producing gelatin from the collagen broth, the apparatus enabling the gelatin to set and dry continuously.

DESCRIPTION OF THE PREFERRED EMBODIMENT

Animal refuse obtained from abattoirs, constituted by hides useless to tanneries, is used for producing gelatin as described in the present invention. The hides in question correspond to the limbs, head, tail, etc. ... which are less interesting to tanners.

These parts of hides are treated so that only the derm is conserved; they are subjected to scraping and slitting in order to eliminate the adhesions or internal fat as well as the epiderm containing the hair and its roots; in this way, only the derm is conserved and subjected to the treatment described hereinafter.

These raw materials are collected straight after the animals have been slaughtered, i.e. no more than three hours, on average, after slaughter.

The fresh derm thus obtained is subjected to a first washing and de-greasing in a solution of sodium hydroxide (of normality close to 0.25) in cold water at a temperature of less than 10° C., the whole being subjected to stirring and maintained for a period of time of between 15 mins. and one hour.

The derm thus washed has a major part of the undesirable organic matter removed therefrom, such as in particular the albumin of the blood which has not yet coagulated and which is easily eliminated in cold water; this first washing also causes the pores to dilate, thus facilitating the dissolution and elimination of the blood.

Figure 1:
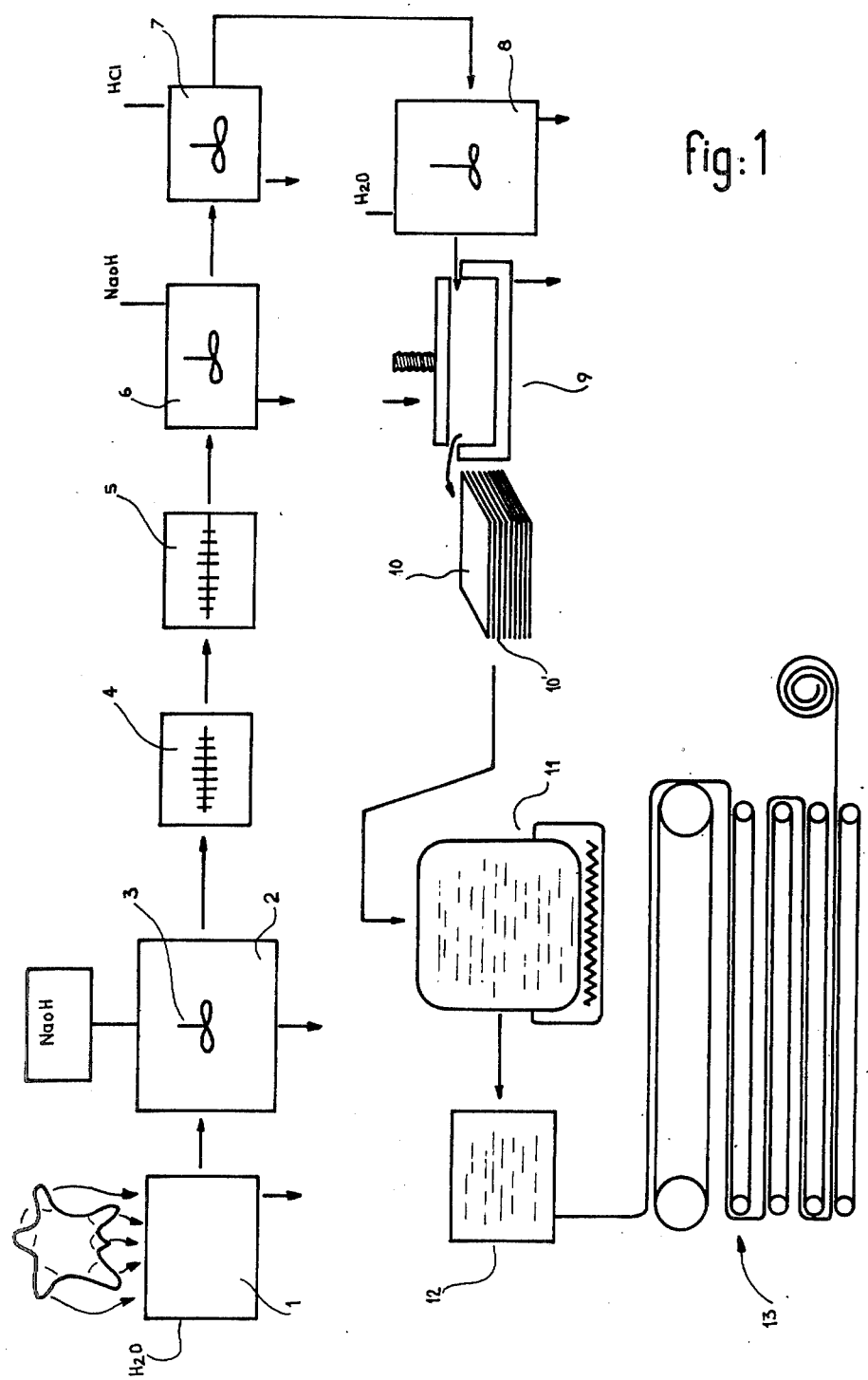
FIG. 1 shows a general diagram illustrating the functioning of the process according to the invention.

Referring now to the drawings, FIG. 1 schematically shows the functioning of the process according to the invention. Therein is shown the optional passage in the two baths 1 and 2; the first bath 1 being essentially a water bath whilst the second washing in bath 2, with action of the stirrer 3, completes the first wash under the conditions described hereinabove.

After rinsing, the pieces of fresh derm are subjected to a first chopping and separation of fibres in a cutter 4 and the raw material which has already been reduced to elements of small dimensions supplies the rotary cutter machine 5, currently used in the food industry, particularly in the delicatessen trade.

It is understood that the scraps of hides used are subjected to the scraping and slitting operations with the aid of a specially adapted machine, derived from the apparatus used in morocco-leather tanneries for working the small surfaces of the tanned leather.

In the cutting machine, the scraps are treated for the time necessary for obtaining the reduction of the raw material into the state of paste.

This paste may then be subjected to subsequent phases (which are optional) of de-greasing and washing in vat 6 with a dilute solution of sodium hydroxide.

After rinsing, the whole is subjected in vat 7 to neutralisation by the addition of a suitable quantity of hydrochloric acid to obtain a neutral pH.

The paste is then subjected to one or more prolonged washings in vat 8 with rinsing.

In this way, a paste is obtained from which everything which is soluble in cold water has been removed, i.e. everything which is not collagen, this latter being soluble only above 30° C., all the preceding phases having been conducted at a temperature lower than 30° C.

The paste leaving vat 8 is then subjected to filtration by pressing in press 9 and the water with which the paste is saturated is removed, to yield a paste containing only 15 to 20% water; the cake is obtained in a press 9 of the fruit press type and the successive cakes are stacked at 10; they are constituted by virtually pure collagen.

The cakes may be subjected to drying and stored for an indefinite period of time, after which they are taken out of storage and subjected to the subsequent gelatin-forming paste. The cake when in a pasty state may be extruded and cut, prior to drying, by using a noodle making machine, so as to form noodle-like pieces of collagen easily dried and thereafter easily subjected to soaking.

The final phase consists in taking the collagen cakes 10, 10' and subjecting them to cooking in a cooking apparatus 11 of known type, which results in the complete dissolution of the collagen, yielding a broth of gelatin of high density.

Figure 2:
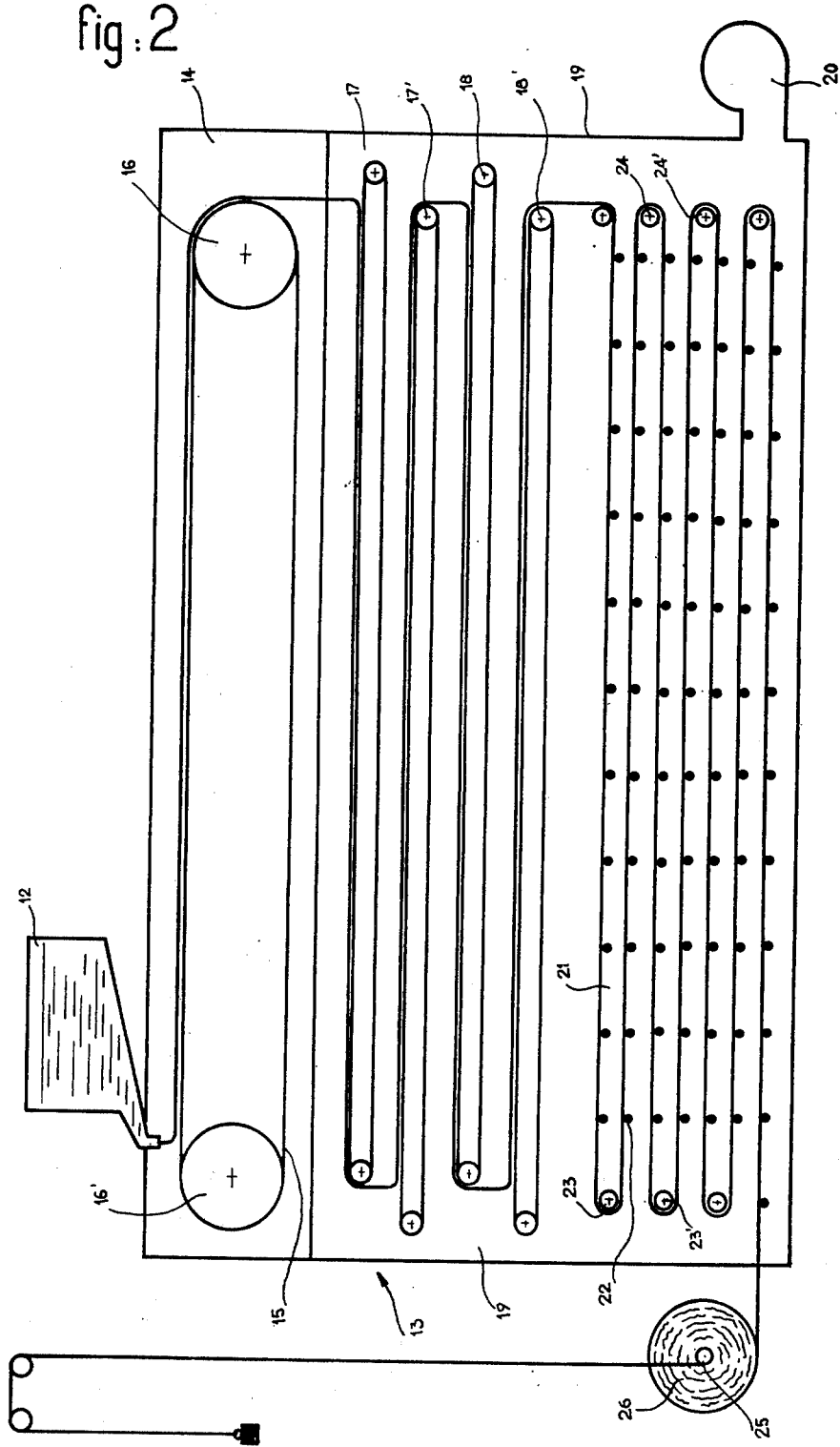
FIG. 2 shows a schematic view in side elevation of an installation for gelling and drying according to the invention, for carrying out the process of the invention.

This broth, at the end of cooking, passes at a temperature of the order of 40° C., into the tank forming feeder 12, from which it is poured onto the setting and drying device 13, which is shown in detail in FIG. 2.

The assembly 13 comprises an upper gelling stage constituted by the chamber 14 maintained at a temperature of 5° C. in which circulates a conveyor formed by a steel belt 15 turning around rollers 16 and 16', of which one driving roller ensures that the belt rotates at an average speed of between 1 and 10 meters per minute.

The conveyor 15 may be of the order of 8 meters in length and, in a preferred embodiment, the width thereof is of the order of 50 centimeters.

Along the whose path of the broth leaving the tank 12, on the conveyor belt 15, in chamber 14 at 5° C., the gelatin has had time to gel and form a film which is delivered at the end of the belt onto a series of conveyor belts 17, 17', 18, 18', providing backward and forward motion and located in the drying stage.

The drying stage is constituted by a closed chamber 19 supplied by the blower member 20 with fresh air maintained at ambient temperature or at a temperature of between 10° and 30° C.

The drying phase eliminates the water present in the gelatin film which is moving on the conveyor belts 17, 17', 18, 18'.

Below the said conveyor belts are located a series of stepped rollers 21, 22, etc. ... which support the strip of gelatin which at this stage is sufficiently strong to dispense with a conveyor belt.

The end rollers 23, 23', 24, 24' enable the film of gelatin to pass from one level of rollers to the level below and pass in the opposite direction.

At the end of the path, the film is taken on a reel 25 moved by a mechanical device such as for example by a driven employing a counterweight.

The conveyors 17, 17' and 18, 18' are driven by the mechanism driving the conveyor 15, whilst the horizontal rollers 21, 22 or the end return rollers 23, 23', 24, 24' are mounted to rotate idly.

In this way, at the end of treatment, a gelatin is obtained which is constituted by a transparent film in the form of a roll 26 mounted on reel 25. The gelatin roll 26 may then be cut into longitudinal strips by machines of known type used in morocco-leather tanneries for making belts and these longitudinal strips may then be cut transversely to yield platelets which may subsequently be reduced, in known grinding devices, to powder.

The gelatin produced by the process according to the invention is an extract of pure collagen, the sequences of the amino acid chains remaining intact and the substances of similar physical characteristics (albumin) which are reputed to be inseparable are eliminated from the starting material before having had the time to form.

The process according to the invention is therefore totally novel and not a simple improvement of heretofore known processes; in fact, the processes for producing gelatin according to the prior art employ raw materials containing collagen, from which the other unwanted substances must be eliminated; on the other hand, the process according to the invention isolates the collagen fibres from the beginning, when their separation is easy, in order to treat only a product constituted by substantially pure collagen.

Under these conditions, the gelatin produced is exempt from mineral residues and the use of milk of lime, employed previously for macerating the products with a view to eliminating the secondary products of albumin type, is no longer necessary.

The process according to the invention makes it possible to obtain, as intermediate product, cakes constituted by substantially pure collagen, which, after their dehydration, may be stored for an extremely long time, thus constituting a reserve supply of intermediate products which may be subsequently taken at any time to obtain gelatin by cooking, gelling and drying.

The process according to the invention may be carried out using extremely modest, reduced equipment, without expensive investments.

The phases leading to the production of collagen cakes require the use only of a few treatment vats of reduced dimensions, a so-called cutter of known type, used in the food industry and of a press of the fruit press type.

This first phase of the treatment may therefore be carried out without difficulty in the slaughter house itself, where the waste and scrap derm will be recovered and immediately treated until collagen cakes are obtained.

The subsequent phase of cooking, gelling and drying may also be carried out in the abattoir if the output of treated products justifies this; cooking takes place in a cooking vat of known type and only the gelling and drying apparatus, in accordance with one of the important features of the present invention, presents specific features.

However, this latter apparatus is inexpensive equipment and may easily be used, without great investment, on the site of production, i.e. in the abattoir itself.

However, in a variant embodiment, the invention may be carried out in the abattoir up to the stage of production of the intermediate product constituted by the collagen cake; this latter, after dehydration, may be stored and may travel, without particular packing, to centres for treatment and production of gelating corresponding to the latter phases of cooking, gelling and drying which will be centralised in centres supplied by several abattoirs.

The invention therefore valorizes products which are considered from the start as products without value.

The invention further enables the exploitation of the hides of slaughtered animals to be rationalised; in fact, in the prior conventional exploitation, the hide scraps were limited since these scraps were considered as valueless and were practically wasted; on the contrary, in the execution of the present invention, the wastes being recovered, used and considerably valorized, the cutting of the hides may be rationalised by allocating to the tannery the most advantageous part of the hide for producing leather and by making a "geometrical cut" to obtain cuts of substantially homogeneous shape and quality, thus improving exploitation at the tanneries; the considerable amount of scrap resulting from this system of cutting and which was previously wasted, is recovered, within the framework of the present invention, and converted into cakes of dehydrated collagen and subsequently into gelatin.

The carrying out of the process according to the invention considerably reduces the time necessary for producing the final product, since the period of time between the first treatment of the hide scraps of the slaughtered animals and the obtaining of the gelatin is of the order of 24 to 36 hours, whilst in the prior known apparatus and processes, the gelatin was obtained after treatments spread over 6 to 8 weeks; in addition, operating conditions which were particularly unpleasant for the staff are avoided on the one hand due to the partially automatic character of the operations, particularly the cooking, gelling and drying, and on the other hand due to the raw materials being treated when fresh.

What is claimed is:

1. A process for manufacturing gelatin from collagen, said collagen being prepared from animal waste, wherein said animal waste forming the raw materials and constituted by scraps of hides, sinews, tendons, are treated immediately after slaughter of the animal and are subjected to the following successive operations:
   (a) the raw materials (derms of hides, sinews or tendons) are washed and de-greased in a solution of sodium hydroxide enabling the pores to dilate and facilitating elimination of the blood and fatty substances;
   (b) the materials are subjected to a chopping operation reducing them to the state of paste.
   (c) the pH of the paste is adjusted to neutralise the sodium hydroxide returning from initial washing phase (a) and the paste thus returned to a neutral pH is washed several times in cold water and rinsed.
   (d) the paste is then subjected to filtration by pressing to express the water therefrom and to conserve only the solid matter forming the cake constituted by substantially pure collagen.

2. A process for preparing gelatin as recited in claim 1, wherein the raw materials, before the phase of reduction into paste, are subjected to a washing by immersion in a solution of sodium hydroxide of normality close to 0.25 N, at a temperature of the order of 10° C. for a period of time of 2 to 6 hours, the whole being subjected to stirring.

3. A process for preparing gelatin as recited in claim 1, wherein the paste, before the phase of filtration by pressing, is subjected to several washings in cold water, at a temperature lower than 30° C. with stirring and rinsing.

4. A process for manufacturing gelatin as recited in claim 1 wherein the cake resulting from phase (d) is subjected to cooking with a view to its hydrolysis into gelatin, yielding a gelatin broth of high density, which is subsequently subjected to gelling at low temperature and to drying.

5. A process for manufacturing gelatin as recited in claim 1, wherein the cake obtained after the pressing phase and constituted by the dry extract of the washed paste, constituted by substantially pure collagen, is dried and stored in the dehydrated state for an indefinite period of time, the collagen subsequently being taken out of storage and subjected to the subsequent cooking phase of obtaining gelatin.

6. A process for separating collagen from animal waste such as scraps of hides, wherein said scraps of hides are treated immediately after slaughter of the animal, thus allowing the albuminous substances such as the blood to be eliminated by washing and avoiding coagulation and fixation of said albuminous substances inside the capillary vessels of the skin, comprising the following successive steps:
(a) subjecting animal hides, or scraps of hides to scraping and slitting to eliminate adhesions or the internal fat as well as the epiderm containing the hair and its roots, so as to conserve only the derm;
(b) washing and degreasing said derms in a solution of sodium hydroxide to allow expansion of the pores and to eliminate fatty substances and blood albumin, before its coagulation, this washing occuring less than 24 hours after slaughter of the animal;
(c) subjecting the degreased derms to a physical chopping operation to reduce the material to the state of a paste;
(d) adjusting the pH of the paste to neutralize the sodium hydroxide resulting from the washing of step (b), washing the neutralized paste several times in cold water, and rinsing the paste;
(e) subjecting the rinsed paste to filtration by pressing to express the water therefrom to conserve only the solid matter forming a cake constituted by substantially pure collagen all the steps above occuring in less than twenty four hours after slaughter of the animal from which said waste has been obtained.

7. A process for separating collagen as recited in claim 6, wherein said derms are subjected to washing in step (b) by immersion in a solution of sodium hydroxide of normality close to 0.25 N, at a temperature of the order of 10° C. for a period of time of 2 to 6 hours while being subjected to stirring, prior to being reduced to a paste to allow expansion of the pores and to eliminate fatty substances and blood albumin, before its coagulation, this washing occuring less than 24 hours after slaughter of the animal from which said waste has been obtained.

8. A process for separating collagen as recited in claim 6, wherein said paste is subjected to several washings in water at a temperature below 10° C. with stirring and rinsing, prior to said filtration step (e).

9. A process for separating collagen as recited in claim 6, which includes the additional steps of drying the substantially pure collagen, and storing it in a dehydrated state.

10. A process for separating collagen as recited in claim 6, which includes the additional steps of;
(f) cooking said cake to obtain by hydrolysis a gelatin broth of high density, and;
(g) gelling said broth by subjecting it to low temperature and drying.

11. A process for separating collagen as recited in claim 7, wherein washing in step (b) includes immersion of said derms in a first bath of pure water prior to said immersion in a solution of sodium hydroxide.

* * * * *